H. J. GAISMAN.
METHOD OF AND MEANS FOR PRODUCING DESIGNATIONS ON PHOTOGRAPHICALLY SENSITIVE ELEMENTS.
APPLICATION FILED APR. 14, 1913.
1,238,504. Patented Aug. 28, 1917.
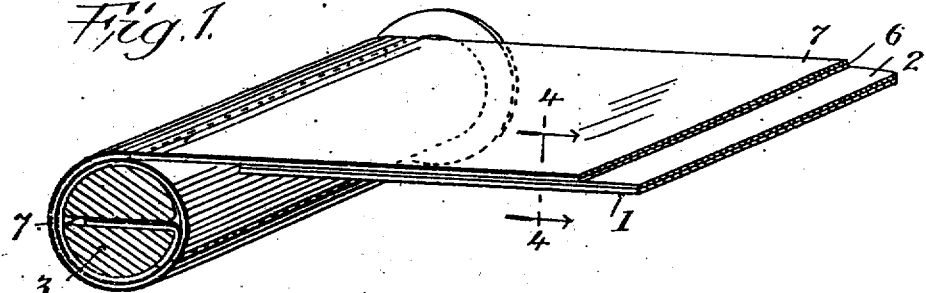
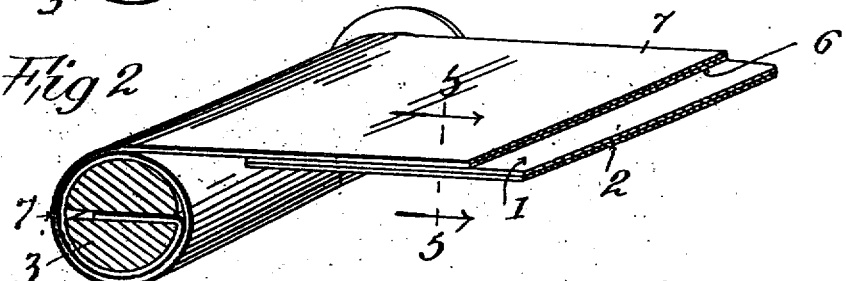
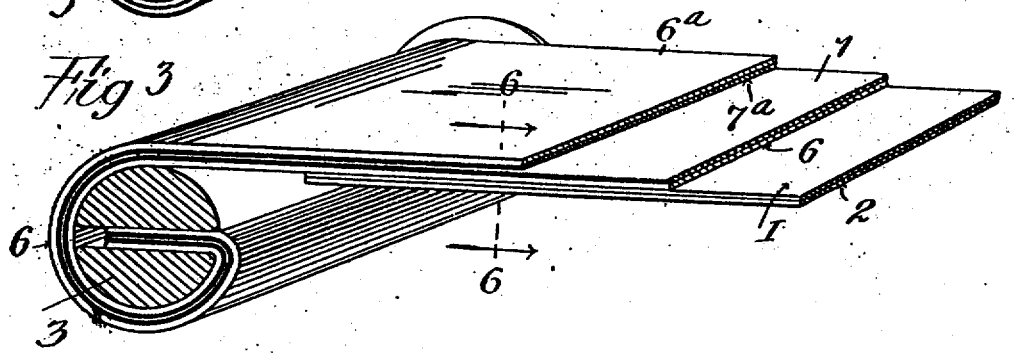
 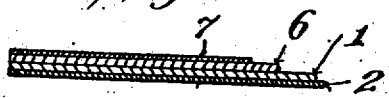
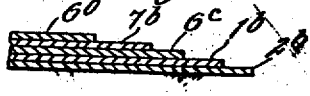
Witnesses:
Inventor
H. J. Gaisman,
By his Attorney
P. F. Bourne

UNITED STATES PATENT OFFICE.

HENRY J. GAISMAN, OF NEW YORK, N. Y., ASSIGNOR TO EASTMAN KODAK COMPANY, OF ROCHESTER, NEW YORK, A CORPORATION OF NEW YORK.

METHOD OF AND MEANS FOR PRODUCING DESIGNATIONS ON PHOTOGRAPHICALLY-SENSITIVE ELEMENTS.

1,238,504.  Specification of Letters Patent.  Patented Aug. 28, 1917.

Application filed April 14, 1913. Serial No. 760,877.

*To all whom it may concern:*

Be it known that I, HENRY J. GAISMAN, a citizen of the United States, and resident of New York city, borough of Manhattan, in the county of New York and State of New York, have invented certain new and useful Improvements in Methods of and Means for Producing Designations on Photographically-Sensitive Elements, of which the following is a specification.

The object of my invention is to provide an improved method of producing any desired designations upon light sensitive elements, such as photographic film, which is adapted to be contained in a holder or camera by altering the light transmitting properties of a covering therefor in the desired characters and then light printing such designations upon such element.

A further object of my invention is to provide a sensitized element for photographic purposes, such as a flexible sensitized film, having an opaque cover or protector associated therewith to exclude the passage of light therethrough before exposure, such cover, being, however, of such a nature as to permit it or a portion thereof to be displaced, as by writing designations upon or against the same while upon said element, to enable such designation to be photographed upon the sensitive surface of said element when such designation is exposed to light, without requiring the element to be exposed through a lens for the purpose of photographing the designation on the element.

In carrying out my invention I provide a photographically sensitive element, such as an ordinary photographic flexible film, and upon or against the same I place an opaque covering sheet or strip, having a body, surface or coating that is more or less readily or freely displaceable, such as a sheet of translucid paper upon at least one surface of which is an opaque displaceable substance. For this purpose I find that a sheet of suitable carbon transfer paper accomplishes the purposes, whereby a designation, such as a name, date, initial or the like, may be written or marked upon, or against, such displaceable surface of such film cover before the film is exposed, and then the displaced portion of said cover may be exposed without the use of a lens to affect the sensitive surface of said film opposite such designation, to photograph on the film the designation made upon such cover. Exposure of the film to take a picture may be made in the ordinary way after the designation has been photographed thereon and then the film may be developed and printed as usual, producing a print having the desired designation thereon. While I have described the displaceable surface on the translucid sheet as of the nature of the opaque coating usually employed upon carbon or transfer papers, it will be understood that my invention is not limited thereto, since the nature of the film cover may be such that while being opaque it may itself be more or less readily or freely cut into or displaced where the designation is produced thereon, affording thereby means for the passage of light through such designation to the film. By preference, I connect together the film and the aforesaid opaque cover in such manner that they will remain face to face in use, the cover thus protecting the film from light while being transported and handled, while serving as a medium to permit a designation, when desired, to be manually produced against the film for photographing thereon without affecting the remainder of the film. With films of the roll-up variety, I preferably provide the opaque cover so that it extends beyond one end of the film, and connect the two together by some suitable adhesive material adjacent to the end or ends of the film, although, of course, the film may be more or less coextensive in length with said protecting means.

The nature and uses of my invention will be more fully hereinafter set forth and then pointed out in the claims.

Reference is to be had to the accompanying drawings forming part hereof, wherein, Figure 1 is a partly sectional view of a flexible film equipped with my invention, shown adapted to roll on a spool in the ordinary manner, illustrating one form of carrying out my invention, wherein the displaceable surface of the opaque film cover is exposed on the exterior surface, and the sensitized surface of the film is opposed to the protecting means;

Fig. 2 is a similar view illustrating the film material or celluloid opposed to the protecting means, and the sensitized surface of the film on the side opposite said means;

Fig. 3 illustrates the film and its sensitized surface as in Fig. 2 covered by two layers of flexible cover, and Figs. 4, 5 and 6 are detail sectional views on the lines 4, 4, 5, 5, and 6, 6, in Figs. 1, 2 and 3 respectively.

Fig. 7 is a sectional view of a modification.

Similar numerals of reference indicate corresponding parts in the several views.

The sensitized element, such as the flexible film 1 having the sensitive surface 2, may be of any well known form, and, as shown in Figs. 1, 2, 3, is adapted to be wound upon a spool, support or the like 3. My improved film cover adapted to have its surface or a portion thereof displaced for the production thereof of desired designations, is indicated at 6, in the nature of a flexible sheet or strip, and placed against or upon the exterior of the film, the nature of such cover being such as to normally exclude light from the film, when in a camera or wound on a support, such cover either having material applied thereon to render the same opaque or being made in such form as to be opaque, yet displaceable, whereby when designations are marked or written upon such cover, as by a pencil, stylus or the like, the corresponding portion of the cover will be displaced, scratched, or cut into producing substantially transparent designations to permit the light to strike the film through such designations. In a preferred form of my invention I provide a translucid paper strip 6 having an opaque material 7 thereon, which may be in the nature of carbon coating on the translucid paper 6. The protecting cover thus lies against the film to normally exclude light therefrom, and in the form shown in Figs. 1, 2 and 3 the opaque strip 6 is secured adjacent to one end of the film and adapted to be wound upon the spool with the film.

The material 7 may be disposed exteriorly of the film, with the sensitized material of the film laid against the translucid paper 6, as in Fig. 1, or with the film material or celluloid 1 laid against the paper 6 and the sensitized surface 2 on the opposite side of film 1, as in Fig. 2. This arrangement of Fig. 1 protects the film or its sensitized surface from contact with the opaque readily displaceable material 7 of the protecting cover, to avoid smearing or affecting the film cover or its sensitized surface, and with such material 7 exposed directly to the action of a pencil or the like, the marking or writing produced thereon will displace the corresponding portion of such displaceable material, permitting the light to strike therethrough to the sensitized film, the remaining or unwritten portion of the cover excluding light from such film.

In the form shown in Fig. 3 the cover 6, 7, may in turn be covered by another flexible cover $6^a$, which may have the displaceable surface $7^a$ placed against the corresponding material 7 of the inner cover. As shown in Fig. 7, the outer cover $6^b$ need not have the material 7 thereon and in this construction the displaceable material $7^b$ is applied to a translucid strip $6^c$, and the celluloid strip $1^b$ is provided with the sensitive emulsion $2^b$.

These arrangements keep the displaceable material 7 or $7^b$ from engaging any part of the film when wound together on the spool, and yet by marking or writing upon the surface of the outer translucid sheet $6^a$ or $6^b$, the material 7 or $7^b$ thereunder will be displaced when the designation is produced thereon to enable the light to strike through such marked or written portion to affect the film for photographing the designation thereon when exposed to light.

It will be understood that my improvements may be used in cameras or photographic apparatus in the ordinary manner of inserting, operating and removing the films, provision being made, however, in the camera, to enable access to at least a portion of the cover on the film for marking or writing against the cover while face to face in the camera, any suitable support within the camera opposed to the portion of the material to be written upon being provided to enable the designations to be properly produced thereon. In the form shown in Figs. 1, 2 and 3, the light may strike through the cover to the film, as the writing on the cover progresses, exposure directly to the light thereby being permitted for any desired period of time to affect the film in such manner as to photograph thereon only such designation through the marked or written upon portion of the opaque cover, after which the film may be exposed to take the picture in the ordinary manner, the film thereafter to be developed and printed as usual. Or, the film may first be exposed in a usual way to take a picture and then the designation may be produced on the film in the manner before described, suitable exposure of such designation being permitted to cause the designation to be produced by the light upon the film, after which it will be developed and printing therefrom may be done as usual.

My invention affords a simple and inexpensive opaque cover for photographic films having the inherent capacity to enable a film to be photographically marked or designated at will, without resort to the dark room for the purpose, since the desired designation may be written or marked upon the opaque displaceable cover that is on the film at any time before or after the film is exposed to the lens without permitting the film opposite the unmarked portion of the cover to be affected by the light. By this means any picture taken or to be taken may be photographically marked wherever the exposure is to be made in the usual way but without regard thereto.

I do not in this application claim a camera having means to permit writing upon or against the sensitized element or the protecting means or cover thereon, but my invention relates to providing a sensitized film with an opaque cover enabling designations to be produced thereon or therein while opposed to and concealing the film, regardless of the particular form of camera in which my invention may be utilized. In this application I use the term "translucid" as meaning transparent or translucent, as distinguished from opaque, although the opaque material covers the translucid material, so that when the opaque material is displaced the light will strike through the translucid material to the film.

By the term "opaque" I mean a film-protecting cover adapted to prevent rays of light from injuriously affecting the sensitized surface of the film, whether the cover be absolutely impervious to light or of the well known ruby or other color, which, while not absolutely opaque, yet itself permits only such portion of the light to reach the film as would not affect its sensitized surface.

While the pressure of the stylus may transfer some of the carbon coating to one of the sheets of the covering paper, which might serve to slightly obstruct the passage of light, nevertheless the displacement of the opaque carbon coating is sufficient to permit the passage of light to the sensitive emulsion to enable the characters traced by the stylus to be light printed upon it.

Having now described my invention what I claim is:

1. A new article of manufacture comprising a flexible photographically sensitized element having an opaque protecting cover thereover, said cover being of a nature to permit a portion thereof to be displaced while over the element to permit light to strike said element opposed to where the displacement occurred to affect the sensitized element behind the cover.

2. A new article of manufacture comprising a flexible photographically sensitized element having an opaque protecting cover thereover, said cover having a portion displaceable by marking thereon while upon the element to permit light to strike said element opposed to where the displacement occurred to affect the sensitized surface of the element.

3. A new article of manufacture comprising a flexible photographically sensitized film having an opaque protecting cover thereover, said cover comprising a translucid flexible sheet having a displaceable opaque coating to enable portions thereof to be displaced while on the film to permit light to strike the film opposed to where the coating of said cover is displaced to affect the sensitized surface of the film.

4. A new article of manufacture comprising a flexible photographically sensitized film having an opaque protecting cover thereon, said cover having a coating comprising carbon displaceable by marking thereon while on the film to permit light to strike the element opposed to where the coating of said cover is displaced to affect the sensitized surface of the film.

5. A new article of manufacture comprising a flexible photographically sensitized film having an opaque protecting cover thereon, said cover comprising a plurality of superimposed translucid sheets, one of said sheets having a displaceable coating facing the other cover sheet.

6. The combination of a support, with a flexible photographically sensitized film having a protecting flexible opaque cover thereon adapted to be wound together upon said support, said cover having a portion adapted to be displaced by marking the same while opposed to the film to permit light to affect the film only opposite such marking.

7. The combination of a support, with a flexible photographically sensitized film having a protecting flexible opaque cover thereon adapted to be wound together upon said support, said cover comprising a translucid sheet having an opaque displaceable coating adapted to be displaced by marking the same while upon the film to permit light to affect the film only opposite such marking.

8. The combination of a support, and a flexible photographically sensitized element, with a flexible protecting translucid sheet upon said element, said sheet having an opaque displaceable coating adapted to be displaced by marking the same while upon the element, said coating being upon the surface of said sheet on its side away from the element, and a flexible protecting cover over said coating.

9. The combination of a support, and a flexible photographically sensitized element, with a protecting translucid sheet upon said element, said sheet having an opaque displaceable coating adapted to be displaced by marking the same while upon the element, and a protecting flexible covering for said sheet.

10. A means for producing a photographic negative comprising a support, a photographically sensitized element thereon, and a flexible protecting covering on said element embodying opaque material, portions of which are displaceable by marking thereagainst while upon said element.

11. A means for producing a photographic negative comprising a photographically sensitized element, an opaque protecting cover thereon to protect it from light, and a support for said element protecting its interior and its edges from light, portions of said opaque cover being displaceable by marking thereagainst.

12. The combination of a support, and a photographic film embodying a flexible transparent element having a sensitized coating on one side thereof, with a flexible cover for the rear side of the element comprising opaque material portions of which are readily displaceable by marking thereagainst while on said element.

13. The method of producing a designation upon a photographically sensitized element having an opaque cover, consisting in displacing a portion of said opaque cover upon said element in designating characters, permitting light to strike said element at the portions formerly protected by the displaced portion of said cover, and then developing said portion of said element.

14. The method of producing a designation upon a photographically sensitized element having an opaque cover consisting in displacing in designating characters a portion of the opaque cover upon said element, permitting light to strike said element at the portions formerly protected by the displaced portion of said cover, then exposing other portions of the sensitized surface of said element to light, and then developing said element.

15. The method of producing a photographic print consisting in protecting a sensitized photographic element with an opaque cover, displacing a portion of said cover in designating characters while upon said sensitized element and permitting the light to strike the sensitized surface of the element at the portions from which the covering has been displaced, then exposing other portions of the sensitized surface of said element opposite said cover, then developing said element, and then printing from said developed element.

16. As a new article of manufacture, the combination with a strip of flexible sensitized photographic film, a flexible translucid strip bearing opaque locally displaceable material and a flexible translucid strip, said strips being wound in superposed relation into a roll with the last mentioned strip outside and the film on the inside.

17. As an article of manufacture, a photographically sensitive element and an opaque protecting covering therefor, the latter having portions readily displaceable in arbitrary indicating characters, while adjacent portions of the sensitive element are protected from the action of actinic light by the undisplaced portions of said covering.

18. A method of producing designations upon light sensitive material while contained in a holder or camera, consisting in altering in arbitrary characters the light transmitting qualities of portions of a light excluding covering for the sensitized material while said material is elsewhere protected by the holder and covering from light, and light printing such characters upon said material through the altered portions.

19. The method of producing arbitrary designations upon a photographically sensitized element comprising tracing the designations in a locally displaceable light excluding covering adjacent to said element and simultaneously exposing the portions of the element beneath such designations to light as the tracing progresses to light print the same on the element.

Signed at New York city, in the county of New York and State of New York, this 12th day of April, A. D. 1913.

HENRY J. GAISMAN.

Witnesses:
T. F. BOURNE.
MARIE F. WAINWRIGHT.